United States Patent [19]

Gray

[11] 4,061,057
[45] Dec. 6, 1977

[54] METHOD FOR ATTACHING CUTTING TIPS TO CUTTING TOOLS

[75] Inventor: Gorman D. Gray, Eagle Creek, Oreg.

[73] Assignee: Lifetime Carbide Company, Colton, Oreg.

[21] Appl. No.: 699,165

[22] Filed: June 23, 1976

Related U.S. Application Data

[62] Division of Ser. No. 637,841, Dec. 5, 1975, abandoned.

[51] Int. Cl.² .............................................. B23D 63/00
[52] U.S. Cl. ..................................................... 76/112
[58] Field of Search ......................................... 76/112

[56] References Cited

U.S. PATENT DOCUMENTS 3,295,396  1/1967  Kolb .................................. 76/112 X
3,800,633  4/1974  Funakubo ............................. 76/112

Primary Examiner—James L. Jones, Jr.
Assistant Examiner—James G. Smith

Attorney, Agent, or Firm—Chernoff & Vilhauer

[57] ABSTRACT

A plurality of individual, pre-formed cutting tips attached to one another in an adjoining series to form an elongate stick of tips are utilized for sequentially attaching the tips to the teeth or cutting portions of cutting tools. Each tip in the stick has a commonly oriented contact surface for attachment to the cutting tool, and a separate pre-formed cutting edge that forms the cutting edge of the tool once the tip has been attached. Attachment of a tip to a cutting tool is accomplished by positioning the contact surface of the lead tip in a stick proximate the tool, and severing the connection between the tip and the remainder of the stick. The tips forming the stick are preferably attached to one another by a meltable adhesive spread over their respective contact surfaces, such adhesive having a melting point lower than that of the tips. The respective tips in the stick are operatively connected to separate teeth or tools by the same adhesive.

6 Claims, 7 Drawing Figures

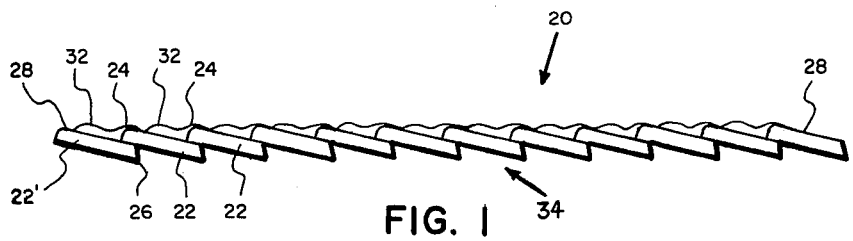
FIG. 1
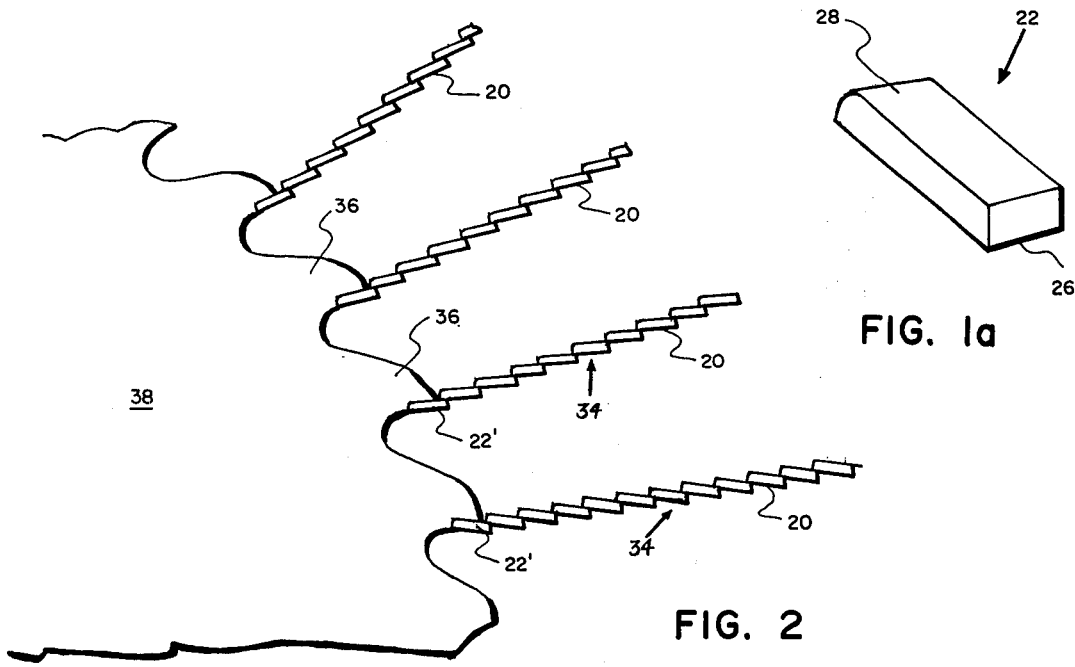
FIG. 1a
FIG. 2
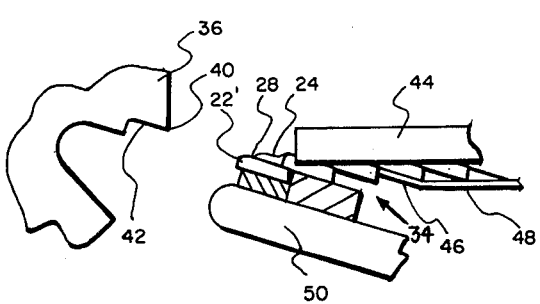
FIG. 3a
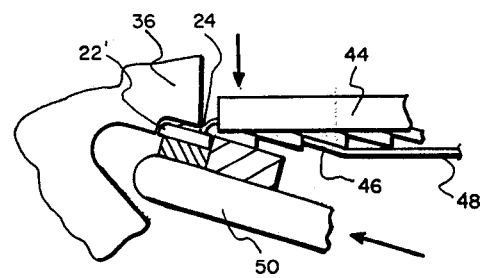
FIG. 3b
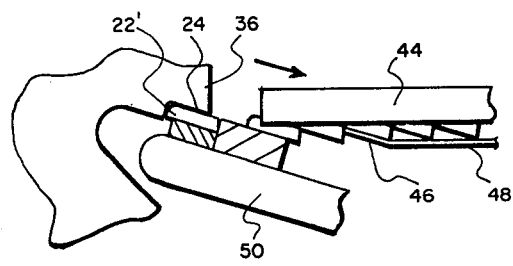
FIG. 3c
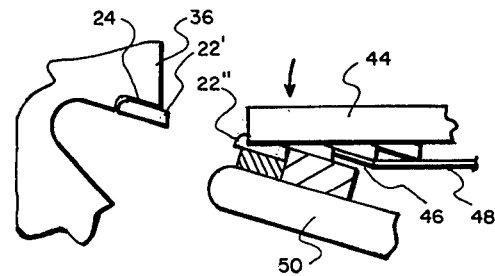
FIG. 3d

METHOD FOR ATTACHING CUTTING TIPS TO CUTTING TOOLS

This is a division of application Ser. No. 637,841, filed Dec. 5, 1975, now abandoned.

BACKGROUND OF THE INVENTION

This invention relates to a method for attaching cutting tips to the teeth of cutting blades. Multi-toothed cutting blades, for example saw blades, having separately attached cutting tips of a material much harder than that of the blade are well-known to the art. The tips may be attached by soldering, brazing, or electrically welding the tips to the blade teeth as disclosed by Drake U.S. Pat. No. 2,714,317, Stevenson U.S. Pat. No. 3,733,934, and Sawamura et al U.S. Pat. No. 3,718,799, respectively. Alternatively, the cutting tips may be formed directly on the blade teeth by depositing globules of molten material thereon and then, after each globule has cooled, shaping and dressing it into a tip as disclosed by Connoy, U.S. Pat. No. 3,063,310. Still further, the tip may be formed by attaching one end of an elongate rod of tip material to the blade tooth and then either breaking the remainder of the rod away from the tip as disclosed by Kolb U.S. Pat. No. 3,295,396, or cutting the remainder of the rod from the tip as disclosed by Anderson U.S. Pat. No. 3,034,378.

A principal disadvantage of the known prior art cutting tips and the methods employed for their attachment to the teeth of multi-toothed cutting blades is the difficulty attendant with handling and precisely positioning small irregularly shaped objects. Normally this difficulty necessitates that the objects, i.e., the cutting tips, be separately handled which is time-consuming and inefficient. It also requires, as a practical matter, that the tips be attached to the cutting blade one tooth at a time as exemplified by Drake and Stevenson. Even in those instances where automatic means have been devised for dispensing, positioning and attaching the cutting tips to the blade teeth, as exemplified by Sawamura, the device employed still positions and handles each tip separately, requiring large and complex handling apparatus which effectively also limits the attachment of the cutting tips to the cutting blade one tooth at a time.

Forming the tips from a molten globular material, as disclosed by Connoy or from a broken or sawn-off portion of an elongate rod, as disclosed by Kolb and Anderson, respectively, requires the additional extensive step of shaping the tip material into a cutting tip after attachment to the blade, which is also inefficient.

Accordingly, a need exists for a means and method of rapidly and efficiently attaching cutting tips to a plurality of cutting teeth of a multi-toothed cutting blade as well as to the cutting portion of single-toothed cutting tools which eliminates the separate handling of individual cutting tips while at the same time minimizing the operations that must be performed upon each tip subsequent to its attachment to the blade or tool.

SUMMARY OF THE INVENTION

The present invention is directed to a novel method for utilizing an assembly of cutting tips formed in a strip for sequential attachment to the teeth of cutting blades or other cutting tools. More particularly, the cutting tip assembly utilized in the present invention comprises a cutting tip stick formed from a plurality of commonly oriented individual cutting tips attached to one another in an adjoining series to form an elongate strip or stick of such tips. Each tip in the stick is pre-formed to have a cutting edge and a separate contact surface for ultimate attachment to a tooth of a cutting blade. As used herein, the term "per-formed" means pre-molded or otherwise pre-shaped to the general configuration of the contact surface or cutting edge, either with or without the requirement that the surface or edge be further dressed or sharpened. The tips are preferably oriented in an inclined position with respect to the length direction of the stick so that their respective cutting edges form a ratchet-like surface along the full length of the stick. The preferred means of attaching the cutting tips to one another is a meltable adhesive having a melting point lower than that of the tips, such adhesive being attached to the respective contact surfaces of each tip and serving also as the medium for ultimately fastening each contact surface to a tooth of the blade. Other means might be employed for fastening the tips to one another, however, such as any suitable non-meltable adhesive or by lightly fusing the tips to one another at their contacting interfaces, without departing from the invention. Also means other than adhesives such as fusion, might be employed to fasten the cutting tips to the blade without departing from the invention. However the use of the same adhesive to perform both functions is considered most efficient and economical.

To attach a cutting tip to a tooth of a cutting tool, for example, a circular saw blade having teeth appropriately notched to receive the tip, the lead tip in the stick is positioned with its adhesive-coated contact surface in contact with the notched surface of the cutting tooth to which it is to be attached. Next, a concentrated localized heat source, such as a suitable inductive heater, is activated to heat the meltable adhesive between the contact surface of the lead tip and the notched tooth until the adhesive melts sufficiently to coat both the contact surface of the tip and the notched tooth and also to sever the lead tip from the remainder of the stick. The tip stick assembly is then withdrawn leaving the lead tip positioned in the notch of the cutting blade tooth while the induction heater is deactivated to permit the adhesive between the contact surface of the tip and the notched surface of the tooth to cool and thereby secure the tip to the tooth. The process is repeated for each tip in the tip assembly until all tips have been attached to a tooth of a cutting blade, afterwhich the tips may be dressed or sharpened if desired.

The ratchet-like surface formed along the length of the tip stick assembly by the respective cutting edges of the cutting tips serves as a convenient engaging surface for an automatic stick feeder, if the stick is not to be fed by hand, permitting the stick to be automatically advanced one tip at a time by a tip-feeding mechanism having an engaging pawl-like member. In this manner the tip stick assembly can be advanced to precisely position the lead tip proximate a blade tooth by a relatively small feed mechanism having a simple reciprocating oscillatory motion.

Because of the essentially one-piece construction of the tip stick assembly, resulting from the attachment of the cutting tips to one another, the tips need not be handled individually and separately to position and attach them, but rather can be handled as a part of a large composite unit much more rapidly and conveniently and with improved precision. Moreover, because of the simplicity of handling, it is possible to position a separate cutting tip-stick assembly and any associated holder or feed mechanism proximate each of a plurality of teeth and around or along a multi-toothed cutting blade, thereby permitting the more rapid and efficient simultaneous attachment of tips to such cutting blade. Furthermore, by including a meltable adhesive on each tip adapted to fasten the tip to the blade, the manipulative step of applying a separate adhesive to the juncture between the cutting tip and the cutting tool before the cutting tip is attached thereto is eliminated, and pre-tinning of the tips is accomplished which strengthens the bond with the tool. Moreover by using the same meltable adhesive both to attach a cutting tip to the cutting tool and to attach the cutting tips to one another in the cutting tip stick assembly, the severing of each tip from the stick becomes automatic as the tip is attached to the tool.

It is, therefore, a principal objective of the present invention to provide a cutting tip stick comprising a plurality of individual cutting tips each pre-formed to a shape adapted for attaching to a cutting tool and each having a pre-formed cutting edge, attached to one another in an adjoining series to form an elongate strip of tips for sequential attachment to the teeth of cutting blades.

It is an additional principal objective of the present invention to provide an improved method of rapidly and efficiently manufacturing single- or multi-toothed cutting tools by attaching individual pre-formed cutting tips to each tooth of such tools utilizing tips supplied from such a cutting tip stick.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side view of an exemplary embodiment of the tip stick of the present invention.

FIG. 1a is a detail perspective view of an exemplary individual cutting tip of the type used in the tip stick of FIG. 1.

FIG. 2 is a partial view of a multi-toothed cutting blade indicating the exemplary positioning of a plurality of tip sticks of FIG. 1 relative to the teeth of the blade.

FIGS. 3a, b, c, and d are sequential detail views showing the relative positions of the tip stick of FIG. 1 during the attachment of a cutting tip to a blade tooth.

DETAILED DESCRIPTION OF THE PREFERRED EMBODIMENT

Referring to FIGS. 1 and 1a, the exemplary tip stick of the present invention, denoted generally as 20, is adapted for attaching cutting tips to saw blades and comprises a plurality of individual cutting tips 22 attached to one another in an adjoining series by a meltable adhesive 24 having a melting point lower than that of the tips to form an elongate strip of such tips. Each tip 22 in the stick 20 is formed of a relatively hard powdered metal material such as tungsten carbide which has been fused, tool grade steel, or other suitable metallic or non-metallic material, to have a pre-formed cutting edge 26 and a separate contact surface 28. The meltable adhesive, for example a silver brazing alloy such as silver solder, is preferably applied to the contact surfaces 28 of the tips 22 forming the tip stick 20 as separate globules which adhere to respective contact surfaces and to a portion of an adjoining tip. A flux to prevent oxidation upon heating may also be applied in any conventional manner. For reasons discussed below, it is preferable that the cutting tips 22 forming the tip stick 20 be aligned with their cutting edges 26 and contact surfaces 28 commonly oriented, as shown in FIG. 1, in an inclined position with respect to the length direction of the stick 20 such that their respective cutting edges 26 form a continuous ratchet-like surface 34 along the full length of the stick. The tip stick itself may be formed to any length convenient for handling, usually at least several feet, and depending upon the flexibility of the adhesive employed to interconnect the tips 22, arranged as a coil or arc to facilitate shipping and handling.

In use, for example to attach cutting tips to the teeth of a multi-tooth cutting blade, one or more tip sticks 20 are oriented each with its respective lead end tip 22' positioned proximate a respective tooth 36 of the blade 38, as indicated in FIG. 2. The end tip 22' is then simultaneously detached from the tip stick and attached to the tooth as described more fully below. If a plurality of tip sticks are employed, the attachment process can be performed simultaneously on different teeth of the blade 38.

Referring now to FIGS. 3a-d, a sequence is disclosed for attaching the lead end tip 22' of a tip stick 20 to a tooth 36 of a cutting blade 38 employing exemplary attaching apparatus. Note that the leading edge 40 of the tooth has been formed with an appropriate notch 42 preparatory to receiving the tip 22. This notch is most economically formed in the tooth at the time the blade 38 is formed. As indicated in FIG. 3a, a channelled feed arm 44 is employed to hold the tip stick and convey the stick toward the tooth 36 of the cutting blade 38. The tip stick 20 is limited to a unidirectional movement along the feed arm toward the blade by the engagement of the ratchet-like surface 34 of the tip stick with the pawl-like end 46 of a retaining spring 48 attached to the feed arm. A positioning arm 50 is employed in combination with the feed arm 44 to advance the tip stick one tip at a time toward the cutting blade and properly position the end tip 22'. The positioning arm can be either mechanically actuated or manipulated by hand.

In operation, the feed arm 44 and positioning arm 50 are moved from their initial positions of FIG. 3a toward the cutting tooth 36 of the cutting blade 38, as shown in FIG. 3b, until the lead end tip 22' is positioned proximate the notched surface 42 formed in the leading edge 40 of the tooth as shown in FIG. 3b. The positioning arm 50 forcibly presses the tip 22' against the notched surface 42 with the meltable adhesive 24, attaching the lead tip 22' to the remainder of the tip stick 20, being sandwiched between the contact surface of the lead tip 22' and the notched surface 42. A concentrated localized heating source (not shown in the Figures for clarity), for example an inductive heater having a coil positioned proximate the interface between the lead tip 22' and the notched surface 42 of the blade tooth 36, is then activated to melt the adhesive 24, thereby simultaneously releasing the lead tip 22' from the remainder of the tip stick and permitting the adhesive 24 to flow by capillary action around and about the interface between the contact surface 28 of the lead tip and the notched surface 42 of the blade tooth 36. As the adhesive 24 connecting the lead tip 22' to the remainder of the tip stick is melted the feed arm 44 is withdrawn from the blade tooth 36 by appropriate spring loading or by hand, to the position indicated in FIG. 3c. The concentrated localized heat source by means well known to the art melts only the adhesive between the lead tip 22' and the blade tooth 36, and thereby permits the remainder of the tip stick to remain intact and manipulable as a single unit. The localized heat source is then deactivated, permitting the adhesive 24 forming the interface between the tip 22' and the notched surface 42 of the blade tooth 36 to cool, thereby fixedly attaching the tip to the tooth. Once the adhesive 24 between the tip 22' and the tooth 36 has cooled, the positioning arm 50 is withdrawn to the position indicated in FIG. 3d for automatic engagement with a new leading tip 22". The process is then repeated for a different blade tooth until each of the cutting tips 22 has been attached to a blade tooth. After the tips have been attached to the blade, their pre-formed cutting edges may be dressed or sharpened if desired.

Although the tip stick 20 has been described in the environment of cutting blades, its use is equally applicable in other environments such as the attachment of cutting tips to chaintype cutting links and to other single- or multi-toothed implements. Moreover the use of non-metallic cutting tips such as ceramic tips, nonmetallic adhesives such as curable binders, and means of attachment other than adhesives such as fusion, are all broadly intended as being within the scope of the invention.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of manufacturing cutting blades of the type having a series of spaced teeth formed therein and a respective pre-formed cutting tip attached to each tooth, each of said pre-formed cutting tips on said blades having a pre-formed contact surface attached to a respective tooth and a pre-formed cutting edge separate from said contact surface oriented in an operative cutting position, said method of manufacturing said blades comprising:
    a. prior to attaching said pre-formed cutting tips to said teeth of said blades, holding said respective pre-formed cutting tips in attached relation to one another in an adjoining series forming an elongate strip of said pre-formed cutting tips;
    b. positioning the pre-formed contact surface of one of said cutting tips located on one end of said strip in close proximity with a tooth of a respective blade;
    c. joining the pre-formed contact surface of said end cutting tip operatively to said tooth such that the pre-formed cutting edge of said end cutting tip is in said operative cutting position; and
    d. detaching said end cutting tip from the remainder of said elongate strip of pre-formed cutting tips.

2. The method of claim 1 wherein said step (a) comprises holding said respective cutting tips in attached relation to one another in said adjoining series by means of an adhesive attached to each contact surface of said cutting tips, and wherein said step (b) includes positioning said adhesive in close proximity with said tooth simultaneously with the positioning of said contact surface in said close proximity, and said step (c) comprises adhering said contact surface operatively to said tooth by means of said adhesive attached to said contact surface.

3. The method of claim 2 wherein said adhesive is a meltable adhesive having a melting point lower than that of said cutting tips, said step (d) comprising heating said meltable adhesive on the contact surface of said end cutting tip to a temperature above its melting point but lower than that of said tips without thereby also melting said adhesive on the contact surfaces of the other cutting tips in said strip, thereby releasing said end cutting tip from said strip, and wherein said step (c) comprises holding said heated adhesive in contact with said tooth while permitting said adhesive to cool to a temperature below its melting point, thereby operatively adhering said contact surface of said end cutting tip to said tooth.

4. The method of claim 1 further comprising performing said steps (a) through (d) simultaneously with respect to different teeth of a single cutting blade.

5. The method of claim 1 further including, prior to step (a), the steps for forming said contact surfaces and cutting edges of said respective cutting tips and thereafter attaching said cutting tips to one another in said adjoining series.

6. The method of claim 1 wherein said step (a) includes holding said cutting tips end-to-end in an inclined position with respect to the length dimension of said elongate strip so that the respective cutting edges form a ratchet-like surface along the length of said strip, and wherein said step (b) includes moving said contact surface of said end cutting tip into proximity with said tooth by engaging said ratchet-like surface of said strip and moving said strip lengthwise toward said tooth.

* * * * *